Sept. 21, 1948.   G. V. ROGERS   2,449,751
LATHE CHUCK
Filed Feb. 5, 1946   3 Sheets-Sheet 1
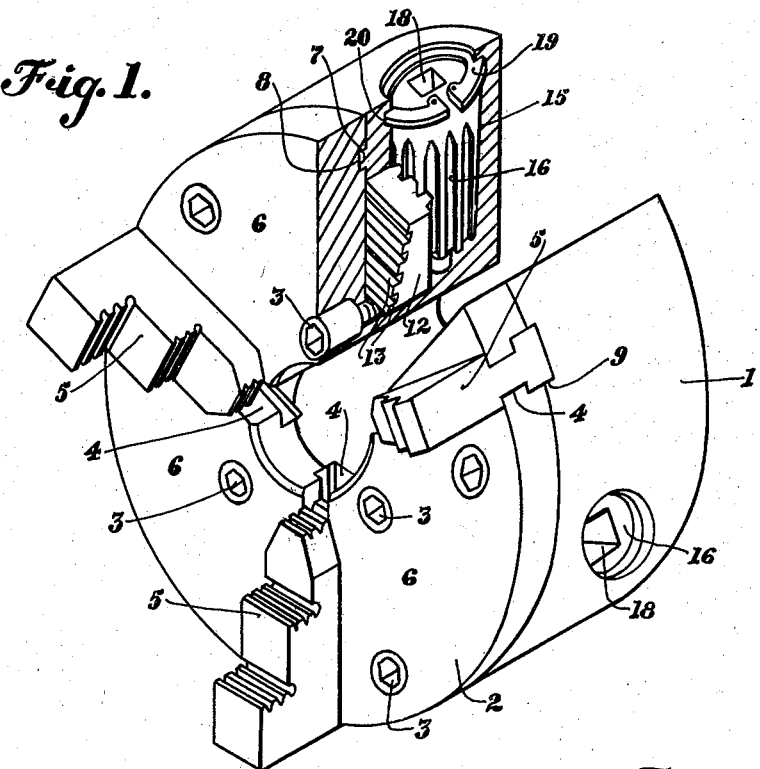
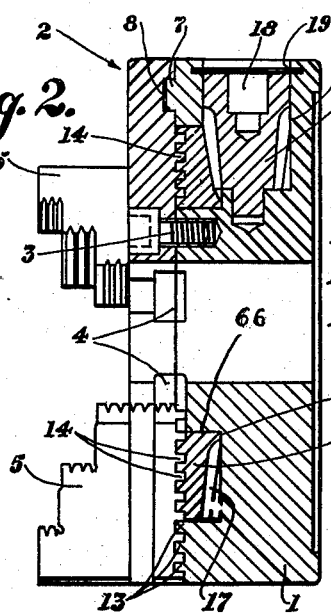
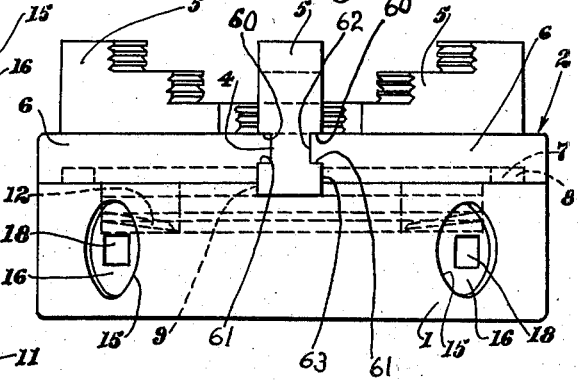
INVENTOR.
BY George V. Rogers
Heard Smith Tennant
atty's.

Sept. 21, 1948.  G. V. ROGERS  2,449,751
LATHE CHUCK
Filed Feb. 5, 1946  3 Sheets-Sheet 2
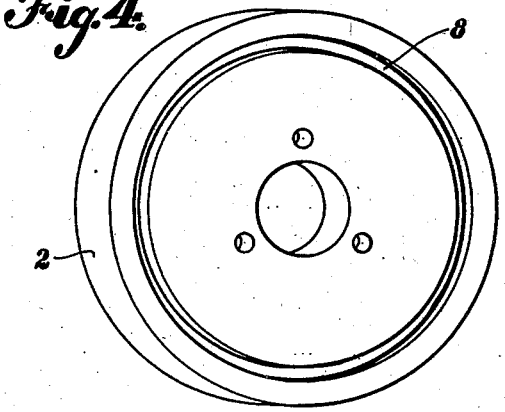
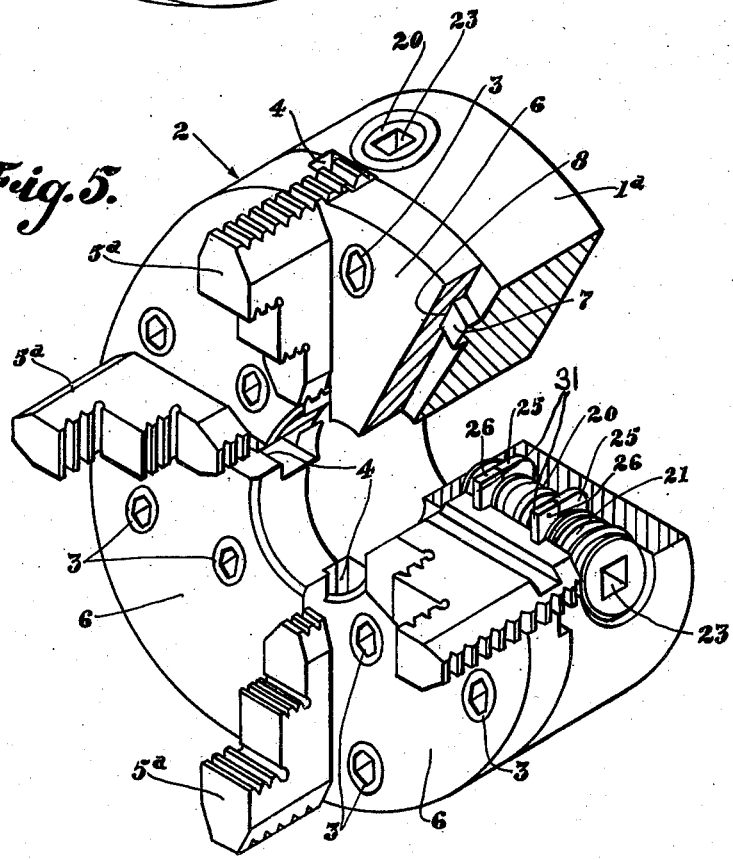
INVENTOR.
BY George V. Rogers
Heard Smith & Tennant
atty's.

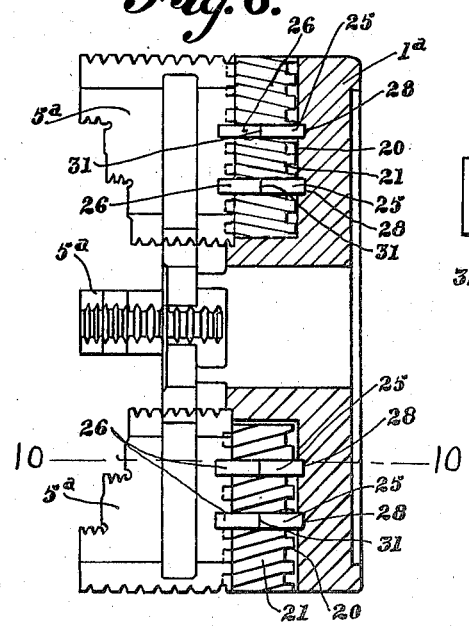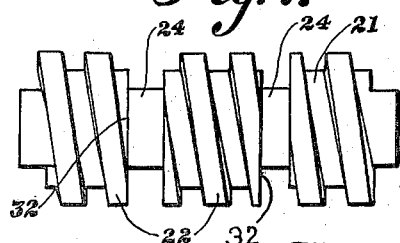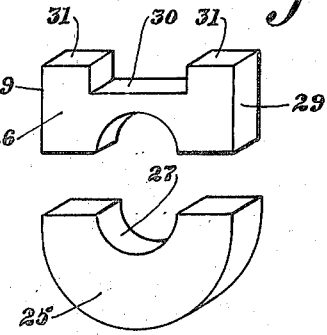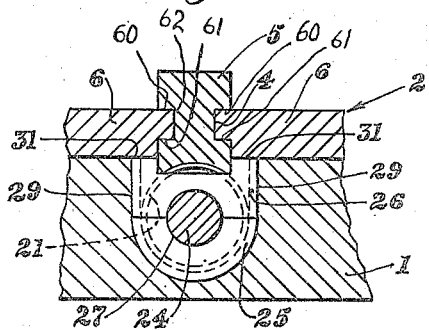
INVENTOR.
George V. Rogers

Patented Sept. 21, 1948

2,449,751

UNITED STATES PATENT OFFICE 2,449,751

LATHE CHUCK

George V. Rogers, Waterford, Conn.

Application February 5, 1946, Serial No. 645,617

2 Claims. (Cl. 279—112)

This invention relates to lathe chucks, and it has for one of its objects to provide a novel chuck construction which is applicable to both scroll chucks and so-called "independent" chucks, and by which the manufacture of the chuck may be simplified and a better chuck produced.

A further object of the invention is to provide improvements in chuck construction which will permit the chuck manufacturer to complete a considerable amount of the machining of the parts of the chuck before it is necessary to segregate the pieces from the production line and to assign them to specific types of chucks to be finished.

My improved chuck is made with a body section in which the jaw-moving means are located, and a front plate section in which the jaw-receiving slots are formed, said slots extending through the front plate section from the front face to the rear face, thereby dividing said front plate section into identical sectors, the radial edges of which constitute the side walls of the slots in which the chuck jaws move.

In the operation of making the chuck embodying my invention, an integral one-piece front plate section of the proper thickness is bolted or rigidly secured to the front face of the body section, and thereafter the jaw-receiving slots are formed in the front plate section by the usual end-milling operation, and as stated above, these slots are cut entirely through the front plate section, thereby dividing it into identical sectors.

After the jaw-receiving slots have thus been made, the sectors into which the front plate section has been divided by the operation of making the slots are removed from the body section and hardened, and then said sectors are ground to precise dimensions, and are then ready to be again bolted to the front face of the body section.

Before this is done, however, the body section will be machined to receive the jaw-moving means, whether such jaw-moving means be in the form of a scroll or in the form of separate jaw-actuating screws. After the body section has been thus machined and the jaw-moving means assembled therewith, the hardened and ground front plate sectors are again bolted to the front face of the body section, thereby producing a chuck in which the walls of the jaw-receiving slots are hardened and accurately ground. As a result, a better chuck will be produced which has a longer life.

Another object of the invention is to provide an improved form of thrust bearing for the jaw-moving screws of an independent chuck.

Other objects of the invention are to provide other improvements in chucks, such as will be more fully hereafter set forth and then pointed out in the appended claims.

In the drawings:

Fig. 1 is a perspective view, with a part broken out, illustrating a scroll chuck embodying the invention.

Fig. 2 is a vertical section through Fig. 1.

Fig. 3 is a side view of the chuck shown in Fig. 1.

Fig. 4 is a perspective view of the front plate section before it has been attached to the body section and before the jaw-receiving slots have been cut therein.

Fig. 5 is a view similar to Fig. 1 but showing the invention as applied to an independent chuck.

Fig. 6 is a section of the line 6—6 Fig. 5.

Fig. 7 shows one of the jaw-moving screws of the chuck, illustrated in Fig. 5.

Fig. 8 shows one of the thrust bearings for the screw shown in Fig. 7.

Fig. 9 is a section on the line 10—10, Fig. 6.

Referring first to Figs. 1 to 4, the chuck comprises a body section 1 in which is carried the jaw-moving means, and a front plate section 2 which is bolted to the body section by means of suitable bolts 3. The plate section 2 has formed therein the radial jaw-receiving slots 4 in which the chuck jaws 5 are mounted, said slots extending clear through the front plate section 2 from the front face thereof to the rear face, thereby dividing said front plate section into a plurality of identical sectors 6.

The chuck shown in Fig. 1 is a three-jaw chuck, and therefore the jaw-receiving slots 4 divide the front plate section into three identical sectors 6.

The front face of the body section 1 is shown as having an annular rib 7 which fits an annular groove 8 formed on the back face of the front plate section 2.

In the manufacture of the chuck, an integral one-piece front plate section 2 such as shown in Fig. 4 is applied to the front face of the body section 1 with the groove 8 on the back face of the front plate section, embracing and receiving the rib 7 on the front face of the body section, and said two sections are then bolted solidly together by the bolts 3.

Thereafter, the jaw-receiving slots 4 may be cut in the front plate section by the usual end-milling operation, said slots being of a depth to extend clear through the front plate section 2 from the front face to the back face, thereby to divide said front face section into identical sectors 6 as above described. These slots 4 will be of the usual T-slot construction to correspond with the usual shape of the jaws 5. In the construction shown, these slots are of a depth so that the bottom of the slots dip into the front face of the body section 1 slightly as indicated at 9.

After these slots 4 have been formed as above described, the sectors 6 of the plate section are removed from the body section 1 and subjected to a hardening operation.

After the sectors 6 have been hardened, each is subjected to a grinding operation for the purpose of producing the accurately-ground back face to fit the front face of the body section, and to produce accurately-ground surfaces 60 and 61 to fit the groove 62 in the side wall of the chuck jaw. If desired also the surfaces 63 and 64 of each sector may be ground, but the most important surfaces to grind are the surfaces 60 and 61 and the back face of the sector.

When the sectors 6 have been thus hardened and ground to precise dimensions then they are ready to be reassembled with the body section 1, after the latter has been machined to receive the particular type of jaw-moving means with which the finished chuck is to be provided, and when such hardened and ground sectors 6 are thus re-assembled with the body section 1, there will be provided jaw-receiving slots which have hardened walls and accurately ground jaw-engaging surfaces.

It has been stated above that the jaw-adjusting means is carried entirely by the body section 1. In the case of a scroll chuck, the body section 1 will be machined to provide the annular recess 11 in which is received the usual scroll 12 carrying on its front face a spiral thread 13 which engages teeth 14 on the inner side of each jaw 5. The body section 1 is also provided with one or more radial recesses 15, each of which is adapted to receive a pinion 16, the teeth of which mesh with teeth 17, formed on the back face of the scroll 12. Each pinion 16 is shown as having a wrench-receiving socket 18 in its outer exposed end, by which it may be turned, thereby to actuate the scroll 12. In the construction shown in Figs. 1 and 2, each pinion member 16 is retained in place by a split spring ring retainer 19, the peripheral portion of which is received in a groove 20, with which the chamber 15 is provided.

If the chuck is an independent chuck, then the body section 1 will be machined to provide a plurality of radial chambers, each of which is adapted to receive a jaw-actuating screw, the threads of which engage teeth on the inside edge of the chuck jaw as usual in so-called independent chucks. A chuck of this type is shown in Figs. 5 and 6, and in said figures the body section of the chuck is indicated at 1a. Said body section is formed with the radial recesses 20, one for each chuck jaw 5a, a jaw-moving screw 21 being mounted in each recess 20. Each screw is provided with screw threads 22 which engage teeth on the inner face of the corresponding jaw 5a as usual in independent chucks, and each screw 21 may be provided in its outer end with the usual wrench-receiving opening 23.

Each screw 21 is held from axial movement by means of a novel thrust bearing construction which constitutes one feature of the present invention. As shown in Fig. 7, each screw 21 may have one or more necked-out sections 24, two such sections being illustrated in the drawings, each necked-out section receiving the novel thrust bearing. This thrust bearing comprises the two sections 25, 26. The section 25 is semicylindrical, and the inner curved face 27 fits the necked-out portion 24 of the screw. The outer peripheral portion of the section 25 is received in a groove 28 formed in the side wall of the screw-receiving recess 20. The thrust bearing section 26 is also of a size to fit the necked-out portion 24 of the screw, and when assembled with the section 25, the two sections completely embrace such necked-out portion. The ends 29 of the section 26 are received in the end portions of the grooves 28, each groove 28 serving to hold the thrust bearing therein from movement in the direction of the length of the screw. The top face of section 26 is cut away as shown at 30 to receive the inner toothed edge of the chuck jaw, and the faces 31 of said section 26 bear against the inner face of the sectors 6 of the front plate section. Said sectors thus serve to clamp the two sections 25, 26 of the thrust bearing tightly together, and each pair of thrust bearing sections 25, 26 provide a full-circle thrust bearing by which pressure is applied on the entire annular surface 32 of the necked-out section 24 of the screw. These thrust bearing sections 25, 26 may be punched pieces which may be hardened and ground to fit the necked-out portions of the screw precisely.

It is to be noted that the operations of assembling the body section and front plate section of the chuck, of end-milling the jaw-receiving slots 4, and of hardening and grinding the resulting sector-shaped pieces 6 into which the front plate section is divided by the formation of the jaw-receiving slots, are the same whether the chuck is eventually to be in the form of a scroll chuck or in the form of an independent chuck.

This is a decided advantage from a manufacturing standpoint, because the manufacturer can carry through these manufacturing operations on a given lot of chucks regardless of whether the chuck is to be finally made up as a scroll chuck or as an independent chuck.

After these operations have been performed, then the body section can be machined either to convert it into a scroll chuck or to convert it into an independent chuck. Therefore, in making up a lot of chucks of the same diameter, the machining of the front plate sections for the entire number of chucks can be carried out without giving any consideration to the type of chuck body with which any plate section is to be used.

Another advantage of the construction herein shown is that since the sectors 6 into which any front plate section is divided when the jaw-receiving slots are end-milled are identical sectors, they are interchangeable so that when the finished sectors 6 are to be assembled with a chuck body section for completing a chuck, the manufacturer can simply take from his stock the finished sectors of the correct size for any body section and assemble such sectors with the body section to complete the chuck. Such sectors 6 for different sizes of chucks can therefore be kept in stock for use whenever required.

I claim:

1. A lathe chuck comprising a body section having a plurality of radial recesses, a front plate section detachably secured to the body section and provided with radial jaw-receiving slots, one for each recess, which slots extend through the front plate section from the front face thereof to the back face, thereby dividing said front plate section into identical sectors, a chuck jaw slideably mounted in each slot, a jaw-actuating screw in each radial recess, the threads of each screw engaging teeth in the corresponding jaw, and each screw having a necked-out portion, and the recess for each screw having a peripheral groove registering with said necked-out portion, a two-part thrust bearing encircling the necked-out portion of each screw, and comprising a front section and a back section, the peripheral portion of said thrust bearing being retained in said groove, the sectors of the front plate section bearing against the front section of each thrust bearing and clamping the two thrust bearing sections together and retaining them in said groove.

2. A lathe chuck comprising a body section having a central opening and having on its front face an annular rib concentric with said opening, a front plate section detachably secured to said front face of the body section and provided on its rear face with an annular groove in which said annular rib fits, said front plate section having a central opening and being provided with a plurality of symmetrically arranged radial jaw-receiving slots which are of a depth to extend from the front face of the front plate section through the latter to the back face thereof and which are of a length radially to extend from said central opening to the periphery of the front plate section, said slots thereby dividing the front plate section into a plurality of separate and independent, but identical, sectors, the radial sides of which constitute the side walls of said slots, a chuck jaw slidably mounted in each slot, and jaw-moving means carried entirely by and located entirely within the confines of said body section.

GEORGE V. ROGERS.

REFERENCES CITED

The following references are of record in the file of this patent:

UNITED STATES PATENTS

| Number | Name | Date |
|---|---|---|
| 422,479 | Whiton | Mar. 4, 1890 |
| 460,601 | Skinner | Oct. 6, 1891 |
| 803,984 | Briggs | Nov. 7, 1905 |
| 1,762,949 | Bassett | June 10, 1930 |
| 2,250,068 | McKay et al. | July 22, 1941 |
| 2,261,836 | Sloan et al. | Nov. 4, 1941 |
| 2,331,909 | Hansel et al. | Oct. 19, 1943 |

FOREIGN PATENTS

| Number | Country | Date |
|---|---|---|
| 76,824 | Switzerland | Jan. 2, 1917 |